UNITED STATES PATENT OFFICE.

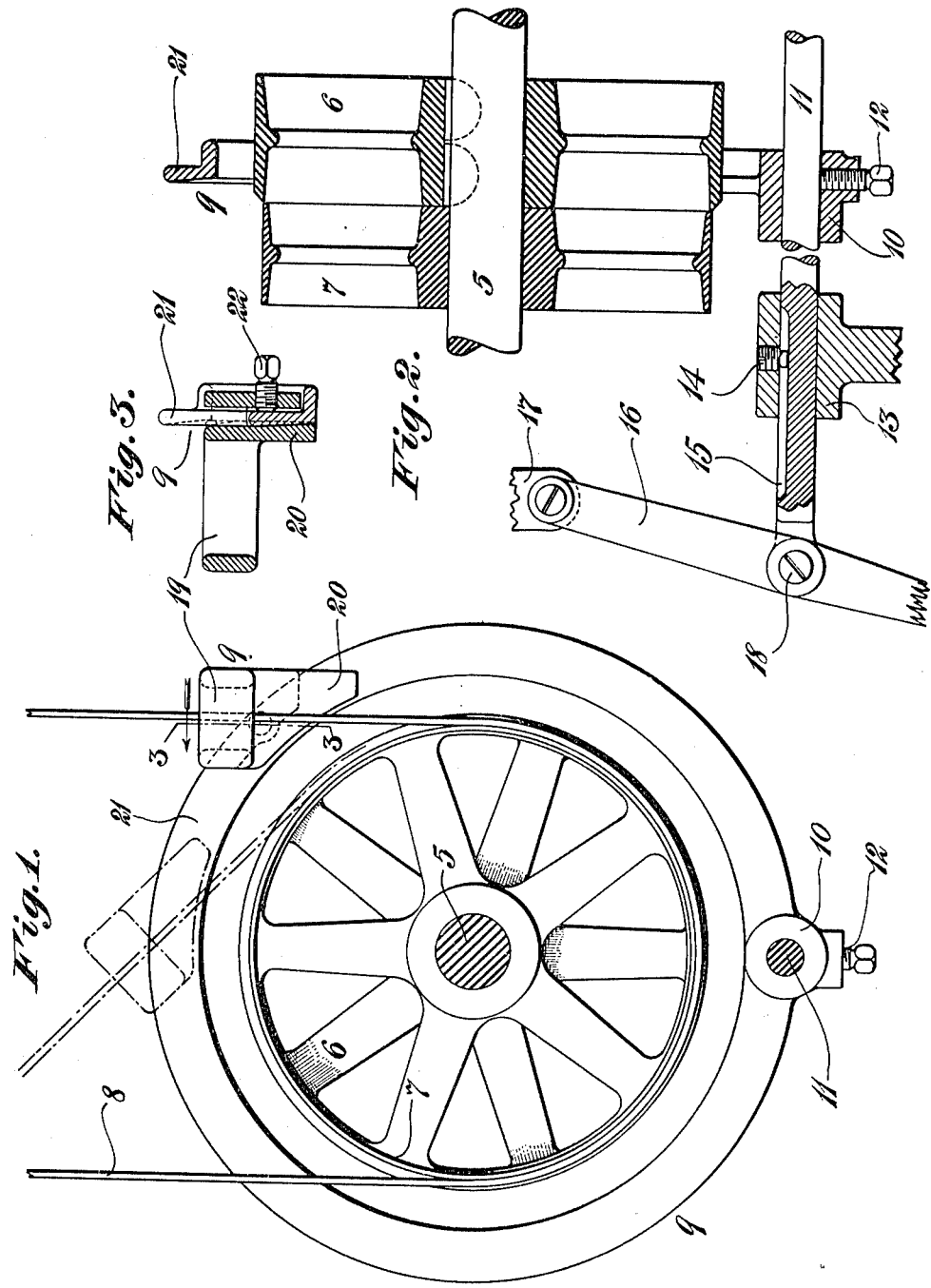

ROBERT G. HENRY, OF WEST HARTFORD, AND WILLIAM J. BAYRER, OF HARTFORD, CONNECTICUT, ASSIGNORS TO THE HENRY & WRIGHT MANUFACTURING COMPANY, OF HARTFORD, CONNECTICUT, A CORPORATION OF CONNECTICUT.

BELT-SHIFTER.

1,073,683.  Specification of Letters Patent.  Patented Sept. 23, 1913.

Application filed August 14, 1911. Serial No. 643,965.

*To all whom it may concern:*

Be it known that we, ROBERT G. HENRY and WILLIAM J. BAYRER, citizens of the United States, residing at West Hartford and Hartford, respectively, in the county of Hartford and State of Connecticut, have invented certain new and useful Improvements in Belt-Shifters, of which the following is a specification.
This invention relates to belt shifters, the object of the invention being to provide an effective and compact device of this character by which the angle of a belt can be varied without affecting its driving ability, by reason of which a machine can be placed at any desirable place with respect to an overhead or otherwise positioned pulley, and still be properly driven.

In the drawings accompanying and forming part of the present specification we have shown in detail one convenient form of embodiment of the invention, which will be fully set forth in the following description, such disclosure being to enable those skilled in the art to practice the invention.

From such statement it will be clear that we do not restrict ourselves to said disclosure; we may depart therefrom in several respects within the scope of the invention included in the claims succeeding said description.

Referring to said drawings: Figure 1 is a side elevation of a belt shifter embodying our invention and also shows fast and loose pulleys and certain other parts, the belt shifting member being represented as occupying two positions by full and dotted lines respectively and the belt being also similarly shown. Fig. 2 is a transverse section of the parts shown in said Fig. 1. Fig. 3 is a section on the line 3—3 of Fig. 1 looking in the direction of the arrow.

Like characters refer to like parts throughout the several figures of the drawings.

A belt shifter involving our invention comprises a body and a belt shifting member carried by said body for adjustment in an arcuate direction, and while this result can be obtained in several ways, we prefer that said body be annular and that the belt shifting member be adjustable thereon in such manner that said member can be adjusted relatively to the belt. In mentioning this body as "annular" we do not necessarily mean that said part is circular but rather that it is continuous or in the form of a band. We obtain the best effects, however, by making said body of circular form, although it is clear that we do not restrict ourselves in this respect, in that we readily provide for the adjustability of the belt shifting member in a circular direction. There is an advantage following the construction of said supporting body in annular form, in that the said body can surround the pulleys, it being moved laterally when it becomes necessary to move a belt from one pulley to another.

It will be apparent from the observations already made that our invention contemplates broadly a belt shifter having an annular body provided with belt shifting means whether the belt shifting means be adjustable or not, although as already intimated we obtain most satisfactory results where the belt shifting means is adjustable on the supporting body.

In Figs. 1 and 2 of the drawings we have shown a shaft 5 which carries the tight and loose pulleys 6 and 7. This shaft 5 may either be a driving or a driven shaft. The belt shiftable from the pulley 6 to the pulley 7 and vice versa, is denoted by 8.

A supporting body such as answers our requirements is that denoted in a general way by 9, said supporting body being shown as circular, of larger diameter than and adapted to alternately surround the pulleys 6 and 7. Said supporting body 9 is shown provided at or upon its circumference with an enlargement or hub 10 which may be bored to receive the rod 11 rigidly connected to the said body 9 by a screw 12 tapped through said hub 10 and engaging the rod 11. This construction also provides a simple means for adjustably connecting said rod or its equivalent with the supporting body 9. The rod 11 is sustained for longitudinal sliding movement by a bearing 13 constituting part of the framework of the machine or other apparatus with which the two pulleys 6 and 7 are associated and a key such as the screw 14 is provided for preventing the rod 11 turning in said bearing 13. The screw 14 is tapped through the bearing 13 and enters a longitudinal keyway or slot 15 in the rod 11. To operate said rod 11 and therefore the supporting body 9 any suitable means may be provided, for example the lever 16 fulcrumed to the bearing 17 also constituting part of said framework and connected as by the pivot 18 with the outer end of the rod 11.

As already stated the annular supporting body 9 is provided with belt shifting means which may vary as to character but which as already indicated is preferably adjustable and a device such as answers our requirements is that denoted by 19. Said belt shifting member as illustrated consists of a loop or eye through which one run of the belt 8 is adapted to pass, said loop or eye 19 being provided with a shank 20 which is grooved or slotted to fit the annular flange 21 upon the circumference of the supporting body 9. It will, therefore, be obvious that the belt shifting member 19 may be adjusted to occupy practically any station upon the annular or circular flange which is almost continuous, being interrupted only by the hub or enlargement 10 to which we have already referred. Therefore the range of adjustment of the belt shifting member 19 is very large. Through one branch of the forked shank 20 is shown tapped a screw 22 which is adapted to engage the flange 21 to thereby hold the belt shifting member 19 in an adjusted position.

It will be assumed that the belt 8 is on the loose pulley 7 and that the belt shifting member 19 is clamped in the position shown in Fig. 1 and that it is desired to shift the said belt onto the tight pulley 6. In this case the hand lever 16 is swung to the right in Fig. 1 thereby through the rod 11 moving the supporting body 9 in a corresponding direction whereby the belt shifting member 19 will move the belt from the said pulley 7 to the pulley 6. It is assumed that there are pulleys directly above the pulleys 6 and 7 and in this case the belt 8 will occupy the position shown by full lines in Fig. 1. It will be supposed that the belt should run at an angle such for instance as shown by dotted lines in Fig. 1. In this event it is necessary to change the position of the belt shifting member 19 which is accomplished by loosening the screw 22 and then moving the said member 19 along the flange 21 until it is in the correct position at which point the screw 22 is tightened up. It will be clear that we can provide for transference of power by means of belts disposed at practically any angle. It is evident that belt shifters of the ordinary type possess the disadvantage that machines have to be placed with great care so as to avoid the belts rubbing against the shifters when the belts are in an angular position. This difficulty we eliminate.

What we claim is:

1. A belt shifter comprising a circular supporting body provided with a circumferential flange extending outward therefrom at approximately right angles thereto, a block slidably engaged with said flange and provided with belt engaging means, means for clamping said block to said flange, and means for moving said supporting body sidewise.

2. A belt shifter comprising a circular supporting body provided with a circumferential flange extending outward at an angle thereto, a block straddling and slidable on said flange, provided with belt engaging means, a set screw on the block for engaging said flange to hold the block in an adjusted position, and means for moving said supporting body sidewise.

In testimony whereof we affix our signatures in presence of two witnesses.

ROBERT G. HENRY.
WILLIAM J. BAYRER.

Witnesses:
HEATH SUTHERLAND,
JAMES O'BRIEN.

---

Copies of this patent may be obtained for five cents each, by addressing the "Commissioner of Patents, Washington, D. C."